United States Patent
Sun

(10) Patent No.: US 8,805,443 B2
(45) Date of Patent: Aug. 12, 2014

(54) METHOD AND APPARATUS FOR PLAYING CHINA MOBILE MULTIMEDIA BROADCASTING SERVICES

(75) Inventor: Jiayang Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 245 days.

(21) Appl. No.: 13/259,272

(22) PCT Filed: Dec. 16, 2009

(86) PCT No.: PCT/CN2009/075631
§ 371 (c)(1),
(2), (4) Date: Dec. 27, 2011

(87) PCT Pub. No.: WO2010/145137
PCT Pub. Date: Dec. 23, 2010

(65) Prior Publication Data
US 2012/0108209 A1    May 3, 2012

(30) Foreign Application Priority Data
Jun. 30, 2009   (CN) .......................... 2009 1 0151541

(51) Int. Cl.
*H04B 1/38* (2006.01)
*H04M 1/66* (2006.01)
*H04M 1/68* (2006.01)

(52) U.S. Cl.
USPC ............ 455/557; 455/558; 455/410; 455/411

(58) Field of Classification Search
USPC .................................. 455/410, 411, 557, 558
See application file for complete search history.

(56) References Cited

U.S. PATENT DOCUMENTS 7,937,750 B2 *  5/2011  Mahalal et al. .................... 726/9
2008/0300017 A1 * 12/2008  Choi .............................. 455/558

(Continued)

FOREIGN PATENT DOCUMENTS

CN        101217399 A      7/2008
CN        101296231 A     10/2008

(Continued)

OTHER PUBLICATIONS

P.R. China, State Intellectual Property Office, International Search Report for International Application No. PCT/CN2009/075631; date of mailing: Apr. 8, 2010.

(Continued)

*Primary Examiner* — Wesley Kim
(74) *Attorney, Agent, or Firm* — Bright IP Law Offices

(57) ABSTRACT

The present invention provides a method for playing the China mobile multimedia broadcasting services. The method comprises the following steps: judging by a data card whether a current subscriber has passed authentication; transmitting by the data card China mobile multimedia broadcasting data to a terminal device according to the judgment result; and playing by the terminal device the China mobile multimedia broadcasting data. The present invention further provides an apparatus for playing the China mobile multimedia broadcasting services, wherein the apparatus for playing the China mobile multimedia broadcasting services comprises: an authentication judging unit; a transmitting unit; and a playing unit. The present invention overcomes the problem that the method for playing the China mobile multimedia broadcasting services in relevant art can only play the clear China mobile multimedia broadcasting program streams without authentication thus limiting the control to the subscriber authority by the providers, and thus achieving the authority control of the providers to subscribers to demand China mobile multimedia broadcasting programs.

15 Claims, 4 Drawing Sheets

(56) References Cited

U.S. PATENT DOCUMENTS

| | | | |
|---|---|---|---|
| 2009/0005118 A1* | 1/2009 | Kim et al. | 455/558 |
| 2009/0024592 A1* | 1/2009 | Lazarski et al. | 707/3 |
| 2009/0158347 A1* | 6/2009 | Ellis et al. | 725/47 |
| 2009/0158350 A1* | 6/2009 | DeCamp | 725/58 |
| 2011/0208529 A1* | 8/2011 | Jeal et al. | 705/1.1 |

FOREIGN PATENT DOCUMENTS

| | | | | |
|---|---|---|---|---|
| CN | 101420512 A | 4/2009 | | |
| EP | 1 788 811 A1 | 5/2007 | | |
| EP | 2001189 A1 * | 12/2008 | | H04L 29/06 |
| WO | 2009017367 A2 | 2/2009 | | |

OTHER PUBLICATIONS

European Patent Office, Extended European Search Report for EP Application No. 09846051.2, mailed Nov. 7, 2013.

Ping Lin, "CMMB Smart Card System Studies," Beijing University of Posts and Telecommunications M.S. Thesis, Mar. 1, 2008.

* cited by examiner

METHOD AND APPARATUS FOR PLAYING CHINA MOBILE MULTIMEDIA BROADCASTING SERVICES

CROSS REFERENCE TO RELATED APPLICATION

This application claims priority to PCT Application No. PCT/CN2009/075631, filed on Dec. 16, 2009, entitled "Method for Playing China Mobile Multimedia Broadcasting Service and Playing Device Thereof," which is hereby incorporated by reference in its entirety.

FIELD OF THE INVENTION

The present invention relates to the wireless communication field and, in particular, to a method and apparatus for playing CMMB (China mobile multimedia broadcasting) services.

BACKGROUND OF THE INVENTION

Part of multimedia programs in the CMMB services are transmitted in the form of clear program streams and can be directly played by mobile terminals which are provided with corresponding play software. However, all the other pay-programs need to suffer authentication process.

In relevant art, a method for playing CMMB services is provided. In the method, a data card is used to receive clear program streams and the clear program streams are transmitted to a terminal device such as a personal computer, a laptop, etc., and then the terminal device plays the programs.

During practical application, the inventors have found that the method for playing the CMMB services in relevant art can only play clear CMMB program streams without authentication, which limits the control of subscriber authority by the providers.

SUMMARY OF THE INVENTION

The present invention is intended to provide a method and an apparatus for playing the China mobile multimedia broadcasting service so as to solve the problem that the method for playing the CMMB service in relevant art can only play clear CMMB program streams without authentication and limits the control of subscriber authority by the providers.

In the embodiments of the present invention, a method for playing China mobile multimedia broadcasting service is provided, comprising the following steps: a data card judging whether a current subscriber has passed authentication; the data card transmitting the China mobile multimedia broadcasting data to a terminal device according to the judgment result; and the terminal device playing the China mobile multimedia broadcasting data.

Preferably, in the above playing method, the data card includes an authentication adaptation layer module and a telecommunication basic service module, and further includes: an intelligent USIM/SIM (user service identity module/subscriber identity module) card interface and/or a SD (secure digital) card interface.

Preferably, in the above playing method, the data card transmitting China mobile multimedia broadcasting data to a terminal device according to the judgment result includes: if the current subscriber has passed the authentication, then the data card transmitting the China mobile multimedia broadcasting data to the terminal device.

Preferably, in the above playing method, the data card transmitting China mobile multimedia broadcasting data to a terminal device according to the judgment result includes: if the current subscriber has not passed the authentication, then the authentication adaptation layer module generating an authentication branch command; the data card carrying out authentication and authorization according to the authentication branch command; and the data card transmitting the China mobile multimedia broadcasting data to the terminal device.

Preferably, in the above playing method, when the authentication branch command instructs that the authentication mode is via the intelligent USIM/SIM card interface, the data card carrying out authorization and authentication according to the authentication branch command comprises: the data card interacting with a mobile network to carry out the authorization and authentication via the intelligent USIM/SIM card interface, the intelligent USIM/SIM card, and the telecommunication basic service module to carry out authorization and authentication.

Preferably, in the above playing method, when the authentication branch command instructs that the authentication mode is via the secure digital card interface, the data card carrying out authorization and authentication according to the authentication branch command comprises: the data card interacting with a secure digital card via the secure digital card interface to carry out the authorization and authentication.

Preferably, in the above playing method, the data card transmitting the China mobile multimedia broadcasting data to the terminal device comprises: the data card responding to a first updating request towards a program service guide initiated by the terminal device and an open request towards an order relationship table initiated by the terminal device; a subscriber selecting a program channel; the data card responding to a second updating request towards program order information initiated by the terminal device and a verification request towards the service key validity of the program channel; and the data card transmitting the China mobile multimedia broadcasting data to the terminal device according to the open request, the second updating request and the verification request.

Preferably, in the above playing method, the data card responding to a first updating request towards a program service guide initiated by the terminal device and an open request towards an order relationship table initiated by the terminal device comprises: the terminal device acquiring the program service guide and order relationship table; the data card acquiring the program service guide and order relationship; and the terminal device judging whether the order relationship table is opened; if the order relationship table is not opened, then the data card opens the order relationship.

Preferably, in the above playing method, the data card responding to a second updating request towards program order information initiated by the terminal device and a verification request towards the service key validity of the program channel initiated by the terminal device comprises: the terminal device judging whether the program has already been ordered; if the program has not been ordered, then the data card completes the order of the program; the terminal device starting the verification of the service key validity of the program channel; and the data card carries out the verification of the service key validity.

Preferably, in the above playing method, the data card transmitting the China mobile multimedia broadcasting data to the terminal device according to the open request, the second updating request and the verification request comprises: if the order relationship has already been opened and the program has already been ordered and the service key is valid, then the data card transmits a China mobile multimedia broadcasting coding stream to the terminal device; the terminal device reading a coding stream of an encrypted encryption key of the program stream in the China mobile multimedia broadcasting coding stream transmitted by the terminal device and composing the coding stream of an encrypted encryption key of the program stream into a packet; the data card decrypting the packet according to the service key to obtain a encryption key of the program stream; and the terminal device decrypting the encryption key of the program stream coding stream according to the encryption key of the program stream to obtain clear program stream; and the terminal device playing the China mobile multimedia broadcasting data comprises: the terminal device playing the clear program stream.

On the other hand, in the embodiments of the present invention, an apparatus for playing the China mobile multimedia broadcasting service is further provided, comprising: an authentication judging unit for judging whether a current subscriber has passed authentication; a transmitting unit for transmitting China mobile multimedia broadcasting data according to the judgment result; and a playing unit for playing the China mobile multimedia broadcasting data.

Preferably, in the above playing apparatus, the transmitting unit comprises: an authentication adaptation layer module for generating an authentication branch command; a telecommunication basic service module for interacting with a mobile network; and an intelligent USIM/SIM card interface and/or an SD card interface.

Preferably, in the above playing apparatus, the authentication branch command comprises: a first authentication branch command for indicating that the authentication mode is via the USIM/SIM card interface; and a second authentication branch command for indicating that the authentication mode is via the secure digital card interface.

Preferably, in the above playing apparatus, the transmitting unit further comprises: an open module for opening an order relationship table; an order module for ordering a program; a verifying module for verifying the validity of a service key; and a descrambling and decrypting module for descrambling and decrypting a scrambled and encrypted program in the China mobile multimedia broadcasting coding stream.

Since data cards are used to process authentication requests, the problem that the method for playing the CMMB service in relevant art can only play the CMMB clear program stream without authentication and limits the control to the subscriber authority of the providers is overcome, thus achieving the authority control of the providers to subscribers to demand CMMB programs.

BRIEF DESCRIPTION OF THE DRAWINGS

The drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention will be described hereinafter in detail with reference to the drawings and in conjunction with the embodiments.

Figure 1:
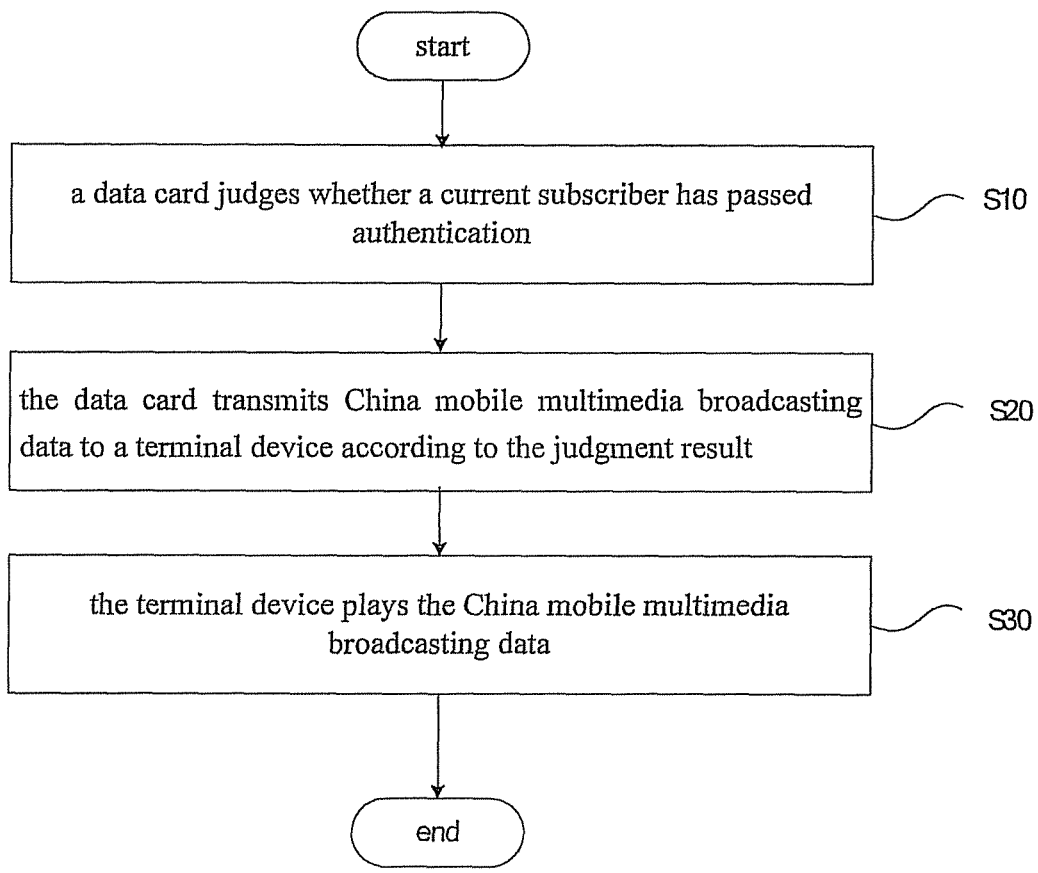
FIG. 1 shows a flowchart of a playing method according to an embodiment of the present invention.

FIG. 1 shows a flow chart of a method for playing the China mobile multimedia broadcasting service according to an embodiment of the present invention, which comprises the following steps:

Step S10: a data card judging whether a current subscriber has passed authentication;

Step S20: the data card transmitting CMMB data to a terminal device; and

Step S30: the terminal device playing the above CMMB data.

In this embodiment, a data card first judges whether a current subscriber has passed authentication, then the data card transmits China mobile multimedia broadcasting data to a terminal device according to the judgment result, and finally the terminal device plays the China mobile multimedia broadcasting data. In this case, the terminal device generally is a PC (personal computer), or a laptop, etc., and the data card can support all the formats of 3G (the 3rd Generation) network. Since data cards are used to process authentication requests, the problem that the method for playing the CMMB services in relevant art can only play the clear CMMB program streams without authentication and limits the control to the subscriber authority of the providers is overcome, thus achieving the authority control of the providers to subscribers demanding CMMB programs.

Preferably, in the above playing method, the data card comprises an authentication adaptation layer module and a telecommunication basic service module, and further comprises: an intelligent USIM/SIM (User Service Identity Module/Subscriber Identity Module) card interface and/or an SD (secure digital) card interface.

In this embodiment, since the CMMB service authentication is achieved mainly by an intelligent USIM/SIM card and a telecommunication basic service module interacting with the network side or with an SD card which has authentication and descrambling and decryption functions, the data card in this embodiment selects these two authentication modes by using the authentication adaptation layer module. The intelligent USIM/SIM card interface is configured for information interaction between the data card and a mobile network, and the SD card interface is configured for information interaction between the data card and a broadcasting network. The data card in this embodiment has an intelligent USIM/SIM card interface, or an SD card interface, or has both of them, wherein the data card which has the intelligent USIM/SIM card interface supports information interaction with a mobile network, the data card which has the SD card interface supports information interaction with an SD card, and the data card which has the intelligent USIM/SIM card interface and the SD card interface simultaneously supports information interaction with a mobile network or an SD card. The object which performs information interaction with the data card is selected according to practical application requirements, and the switching between these two kinds of interfaces is performed so as to achieve the docking with various interfaces, which enriches information interaction modes and improves the universality of the CMMB playing method.

Preferably, in the above playing method, step S20 comprises: if the current subscriber has passed the authentication, then the data card transmits the CMMB data to the terminal device.

In this embodiment, if the current subscriber has passed the authentication, then the data card transmits the CMMB data to the terminal device, i.e. it does not need to use a data card to perform the authorization and authentication process, which accelerates the transmission and playing rates of CMMB data.

Preferably, in the above playing method, step S20 comprises: if the current subscriber has not passed the authentication, then the authentication adaptation layer module generates an authentication branch command; the data card carries out authorization and authentication according to the authentication branch command; and the data card transmits the CMMB data to the terminal device.

In this embodiment, if the current subscriber has not passed the authentication, then the authentication adaptation layer module in the data card generates an authentication branch command, the data card carries out the authorization and authentication according to the authentication branch command, and then transmits the CMMB data to the terminal device, i.e. the data card in this embodiment supports the function of authenticating the current subscriber. In this way, the application of CMMB services on terminal devices such as PCs is extended, and the object of supporting the subscriber acquiring mobile audio and video programs in CMMB is achieved to a greater extent.

Preferably, in the above playing method, when the authentication branch command instructs that the authentication mode is via the intelligent USIM/SIM card interface, the data card carrying out the authorization and authentication according to the authentication branch command comprises: the data card interacting with a mobile network via the intelligent USIM/SIM card interface, intelligent USIM/SIM card and the telecommunication basic service module to carry out the authorization and authentication.

In this embodiment, when the authentication branch command generated by the authentication adaptation layer module instructs that the authentication mode is via the intelligent USIM/SIM card interface, the data card performs information interaction with the mobile network via the intelligent USIM/SIM card interface and the telecommunication basic service module, which achieves the authorization and authentication to the current subscriber. Interaction with the mobile network via the intelligent USIM/SIM card is one of the main methods achieving the authorization and authentication, and this embodiment carries out the authentication step in the CMMB playing method by configuring the intelligent USIM/SIM card interface.

Preferably, in the above playing method, when the authentication branch command instructs that the authentication mode is via the SD card interface, the data card carrying out the authorization and authentication according to the authentication branch command comprises: the data card interacting with an SD card via the SD card interface to carry out the authorization and authentication.

In this embodiment, when the authentication branch command generated by the authentication adaptation layer module instructs that the authentication mode is via the SD card interface, the data card interacts with an SD card which has the functions of authentication, descrambling and decryption via the SD card interface, to achieve the authorization and authentication to the current subscriber. Interaction with the SD card which has the functions of authentication, descrambling and decryption via the SD card interface is one of the main methods carrying out the authorization and authentication, and this embodiment carries out the authentication step in the CMMB playing method by configuring the SD card interface.

Figure 2:
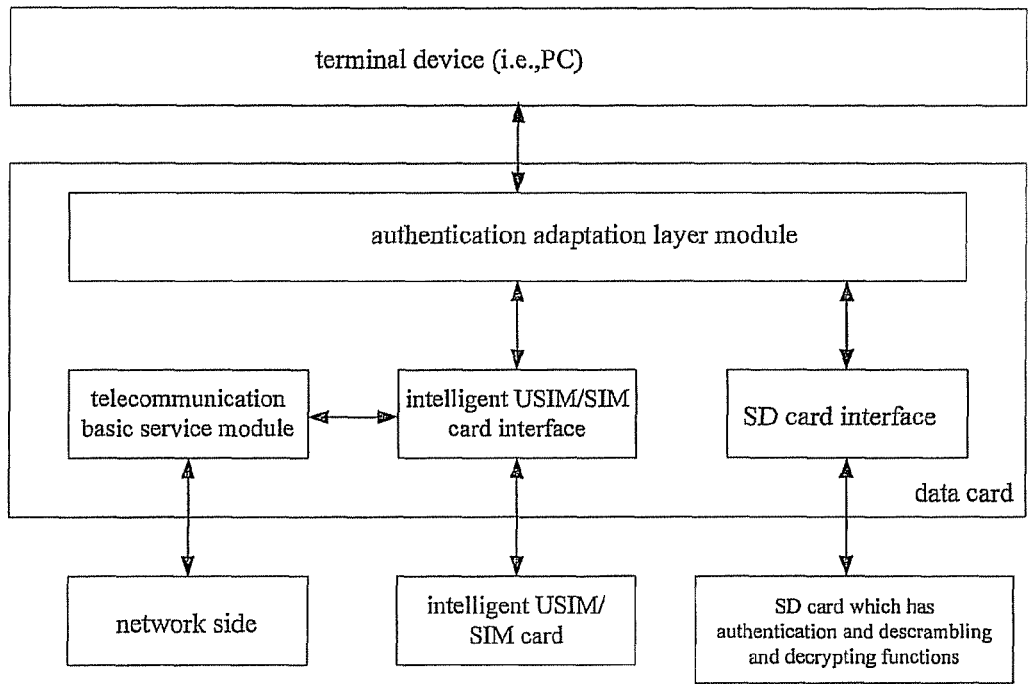
FIG. 2 shows a schematic diagram of network interaction according to another embodiment of the present invention.

In addition, since the solutions of using an intelligent USIM/SIM card and using an SD card are independent and they are managed by different operating departments, the data card in this embodiment is configured with an intelligent USIM/SIM card interface and an SD card interface simultaneously; as shown in FIG. 2, the subscriber can select an object which performs information interaction with the data card according to practical application requirements and the authentication branch command generated by the authentication adaptation layer module is used to switch between these two kinds of interfaces to achieve the docking with various interfaces, which enriches authorization and authentication modes, thus improving the adaptability of CMMB playing method. Referring to FIG. 2, a terminal device (such as PC) interacts with a data card for various commands and responses. On one hand, the data card can interact with the network side by the intelligent USIM/SIM card and a telecommunication basic service module via the intelligent USIM/SIM card interface, and on the other hand, it can interact with an SD card via the SD interface.

Figure 3:
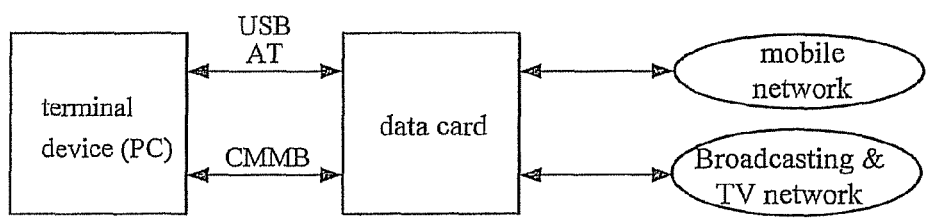
FIG. 3 shows a schematic diagram of network interaction according to another embodiment of the present invention.

FIG. 3 shows a schematic diagram of network interaction according to another embodiment of the present invention, in which, a terminal device (such as PC) and a data card both are configured with an intelligent USIM/SIM card interface and an SD card interface, the terminal device sends a command to the data card via a USB (Universal Serial Bus) AT (Attention Command) port. In this embodiment, a USB port is used to interface between the data card and the terminal device and other types of computer communication interfaces can also be used. The data card can interact with a mobile network via the intelligent USIM/SIM card interface and can also interact with a broadcasting & TV network via the SD card interface, and after having completed the authentication, descrambling and decryption of CMMB service, the data card uploads the CMMB data received from the broadcasting & TV network to the terminal device.

Preferably, in the above playing method, the data card transmitting the CMMB data to the terminal device comprises: the data card responding to a first updating request towards a program service guide and an open request towards an order relationship table initiated by the terminal device; a subscriber selecting a program channel; the data card responding to a second updating request towards program order information and a verification request towards the service key validity of the program channel initiated by the terminal device; and the data card transmitting the CMMB data to the terminal device according to the open request, the second updating request and the verification request.

In this embodiment, after the current subscriber has obtained authorization and authentication, the data card responds to the first updating request towards the program service guide and the open request towards the order relationship table initiated by the terminal device, then the subscriber selects a program channel, and then the data card responds to a second updating request towards the program order information and a verification request towards the service key validity of the program channel initiated by the terminal device, and finally the data card transmits the CMMB data to the terminal device according the open request, second updating request and verification request. The playing method of this embodiment not only supports the CMMB service authentication of the current subscriber but also supports the updating of service guide and order intimation of CMMB programs, which facilitates the use of subscribers and improves user experience, and at the same time also supports the check of the service key validity of program channels, which further improves authority control and security of CMMB programs.

Preferably, in the above playing method, the data card responding to a first updating request towards a program service guide initiated by the terminal device and an open request towards an order relationship table initiated by the terminal device comprises: the terminal device acquiring a program service guide and an order relationship table; the data card acquiring the program service guide and the order relationship; and the terminal device judging whether the order relationship table is opened; if the order relationship table is not opened, then the data card completes the open of the order relationship.

In this embodiment, the program service guide and order relationship table are acquired by a terminal device, the data card acquires the program service guide and order relationship, and the terminal device judges whether the order relationship table has been opened. If the order relationship table is not opened, the data card completes the open of the order relationship to achieve that the data card responds to the first updating request towards the program service guide and the open request towards the order relationship table initiated by the terminal device. In this embodiment, the updating of program service guide and the open of order relationship table are achieved by a terminal device first initiating a request and then the data card responding to the relevant request. Since the judgment that whether the program service guide needs to be updated and whether the order relationship table has been opened is performed by the terminal device, which shares the work of the data card, the complexity of the data card is reduced and the stability of the data card as a whole is improved. And at the same time, the data card being used to complete such tasks as updating the program service guide, opening the order relationship table, etc. also makes the CMMB play software of the terminal device easily, which improves security.

Preferably, in the above playing method, the data card responding to a second updating request towards program order information initiated by the terminal device and a verification request towards the service key validity of the program channel initiated by the terminal device comprises: the terminal device judging whether the program has already been ordered; if the program is not ordered, then the data card completes the order of the program; the terminal device starting the verification of the service key validity of the program channel; and the data card carries out the verification of the service key validity.

In this embodiment, whether the program has already been ordered is judged by the terminal device. If the program has not been ordered, the data card completes the order of the program, the terminal device starts the verification of service key validity of program channel, and the data card carries out the verification of the service key validity, which achieves that the data card responds to the second updating request towards the program order information and the verification request towards the service key validity of program channel initiated by the terminal device. In this embodiment, the updating of program service guide and the open of order relationship table are achieved by a terminal device first initiating a request and then the data card responding to a relevant request, and since the judgment that whether the program service guide needs to be updated and whether the order relationship table has been opened is performed by the terminal device, the work of the data card is shared, the complexity of the data card is reduced and the stability of the data card as a whole is improved. And at the same time, the data card being used to complete such tasks as updating the program service guide, opening the order relationship table, etc. also makes the CMMB play software of the terminal device easy, which improves security.

Preferably, in the above playing method, the data card transmitting the CMMB data to the terminal device according to the open request, the second updating request and the verification request comprises: if the order relationship has already been opened, the program has already been ordered and the service key is valid, then the data card transmitting the CMMB coding stream to the terminal device; the terminal device reading a coding stream of an encrypted encryption key of the program stream, and composing the coding stream of the encryption key encrypting the program stream into a packet; the data card decrypting the packet according to the service key to obtain an encryption key of the program stream; and the terminal device decrypting the coding stream of the encryption key encrypting the program stream according to the encryption key of the program stream to obtain a clear program stream; and step S30 includes: the terminal device playing the clear program stream.

In this embodiment, the CMMB coding stream transmitted to the terminal device by the data card are encrypted and scrambled, and therefore, it needs to decrypt and descramble it so as to play normally; after having received the CMMB coding stream transmitted by the data card, the terminal device first reads the coding stream of the encryption key encrypting the program stream in the CMMB coding stream transmitted by the terminal device, and composes the coding stream of the encryption key encrypting the program stream into a packet to be sent to the data card, the data card decrypts the packet according to the service key to obtain an encryption key of the program stream, and the terminal device decrypts the coding stream of the encryption key encrypting the program stream according to the encryption key of the program stream to obtain a clear program stream and plays the clear program stream so as to meet the audio and video on demand requirements of the subscribers. This embodiment not only supports the authentication of CMMB service and the updating of service guide and order relationship and also supports the decryption and descrambling of CMMB service, on the one hand, it enhances security and meets the control of subscriber authority by the providers, and on the other hand, the integration and support of multi-function also facilitates the use of subscribers.

Figure 4:
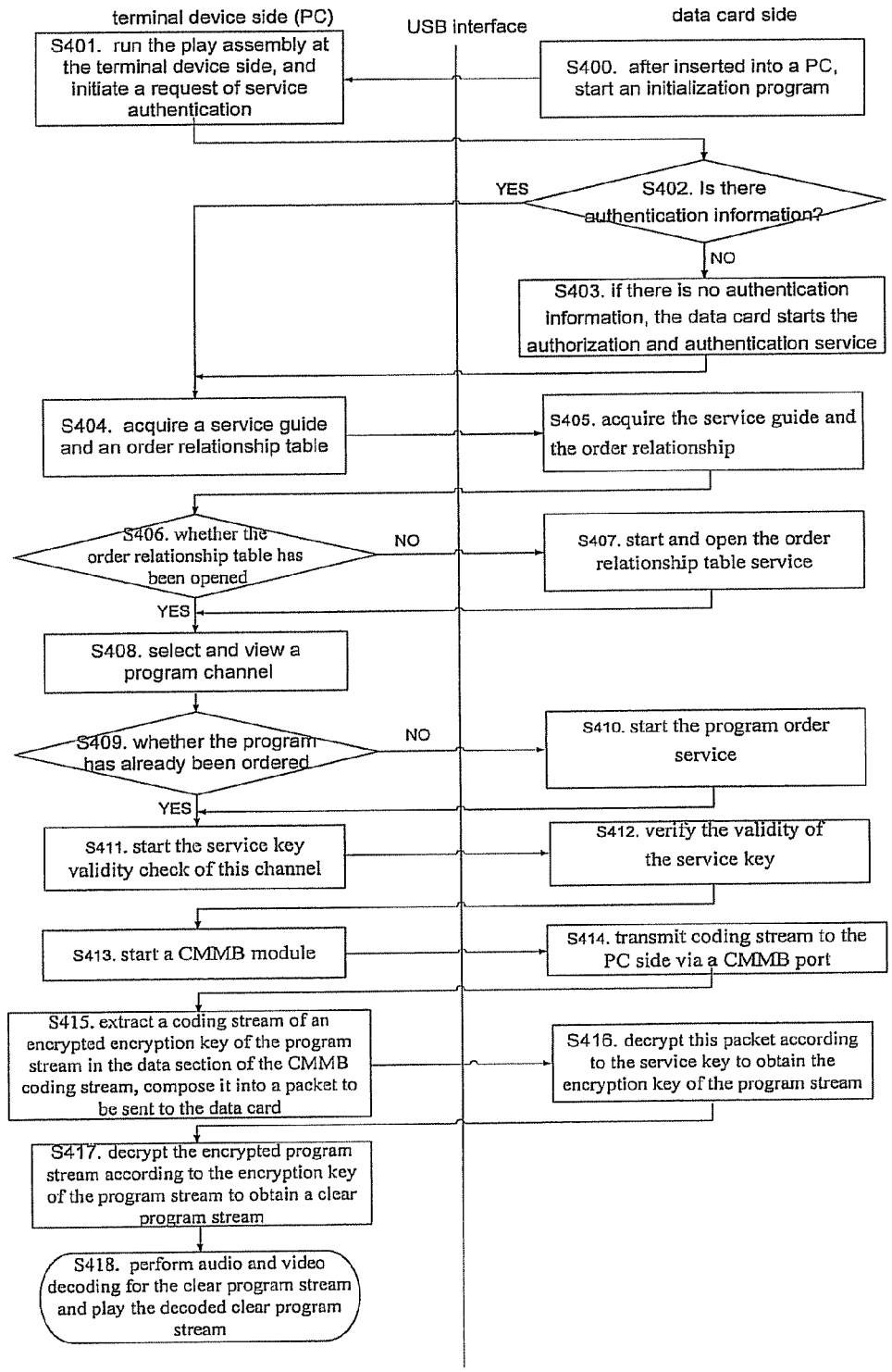
FIG. 4 shows a flowchart of a playing method according to another embodiment of the present invention.

FIG. 4 shows a flow chart of a playing method according to another embodiment of the present invention, in which, taking PC as terminal device for example, this method comprises the following steps:

Step S400: when a data card is inserted into a terminal device (PC), start an initialization program;

Step S401: the terminal device (PC) runs a UI (user interface) play assembly and initiates a request of service authentication. And since the data card has already been initialized, when the CMMB play client software at the terminal device (PC) side is started, the data card can immediately make responses, which accelerates CMMB play speed;

Step S402: the data card judges whether the current subscriber has passed the authorization and authentication, i.e. whether there is authentication information, and if there is authentication information, then go to step S404;

Step S403: if there is no authentication information, then send a command of starting authorization and authentication via a USB AT port, and the data card carries out the authorization and authentication according to a particular authentication mode (whether it is intelligent USIM/SIM card mode or SD card mode), the corresponding result information is stored in the SIM/USIM card or the SD card which has an authentication function;

Step S404: the terminal device (PC) acquires a program service guide and an order relationship table and sends a corresponding command via the USB AT port;

Step S405: the data card acquires corresponding information and returns it to the terminal device (PC) side;

Step S406: the PC obtains program information according to the returned service guide and checks whether the order relationship table has already been opened, if yes, then go to step S408;

Step S407: if it has not been opened, then the terminal device (PC) sends a command via the USB AT port, and the data card interacts with the network side to perform the open process;

Step S408: the subscriber clicks a program channel to view;

Step S409: the terminal device (PC) checks whether the current program has already been ordered, if yes, then go to step S411;

Step S410: if it has not been ordered, then the terminal device (PC) sends a command via the USB AT port, and the data card interacts with the network side to perform the program order process;

Step S411: the terminal device (PC) sends a command to start the validity check towards the service key of this channel;

Step S412: the data card verifies the validity of this service key and returns the result to the terminal device (PC);

Step S413: if the order relationship table has already been opened, the program order is valid, and the service key of program is valid, then the terminal device (PC) sends a command to start the transmission of the CMMB coding stream of the broadcasting & TV network by the data card to the PC side;

Step S414: the data card transmits the coding stream to the terminal device (PC) via a CMMB port;

Step S415: the terminal device (PC) reads the coding stream of the encryption key encrypting the program stream via the CMMB port and composes it into a packet to be sent to the data card;

Step S416: the data card calls the interface of SIM/USIM or the SD card interface, achieves the decryption of the coding stream of the encryption key encrypting the program stream in this packet according to the service key of corresponding order relationship stored in the card and returns the obtained key of the program stream to the terminal device (PC);

Step S417: the terminal device (PC) decrypts the encrypted coding program stream in the audio and video sections of the coding stream received at the CMMB port by using the returned key of the program stream to obtain the clear program stream; and Step S418: the terminal device (PC) performs audio and video decoding for the clear program stream and plays it.

When the playing needs to be ended, the, the terminal device (PC) sends a command to end the data card transmitting the CMMB program.

Figure 5:
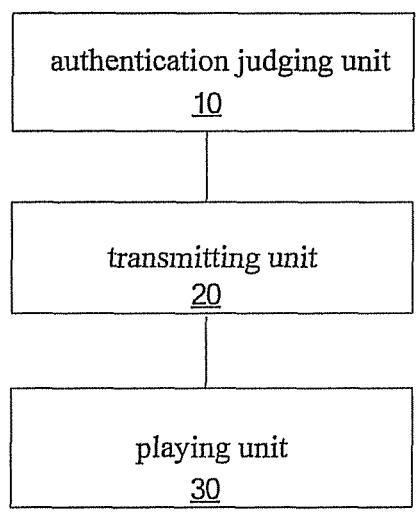
FIG. 5 shows a structure diagram of a playing apparatus according to another embodiment of the present invention.

FIG. 5 shows a structure diagram of a playing apparatus according to another embodiment of the present invention, which apparatus comprises:

an authentication judging unit 10 for judging whether a current subscriber has passed authentication;

a transmitting unit 20 for transmitting China mobile multimedia broadcasting data according to the judgment result; and a playing unit 30 for playing the China mobile multimedia broadcasting data.

In this embodiment, the authentication judging unit 10 is first used for judging whether the current subscriber has passed authentication, and then the transmitting unit 20 is used for transmitting China mobile multimedia broadcasting data according to the judgment result, and finally the playing unit 30 is used for playing the China mobile multimedia broadcasting data. In this embodiment, since the transmitting unit 20 is used for processing authentication requests, the problem that the method for playing the CMMB service in relevant art can only play the clear CMMB program stream without authentication and limits the control to the subscriber authority of the providers is overcome, thus achieving the authority control of the providers to subscribers to demand CMMB programs.

Preferably, in the above playing apparatus, the transmitting unit in particular comprises: an authentication adaptation layer module for generating an authentication branch command; a telecommunication basic service module for interacting with a mobile network; and an intelligent USIM/SIM card interface and/or an SD interface.

In this embodiment, since the CMMB service authentication is achieved mainly by an intelligent USIM/SIM card and a telecommunication basic service module interacting with the network side, or singly with an SD card which has authentication and descrambling and decryption functions, this embodiment selects these two authentication modes by using the authentication adaptation layer module to generate the authentication branch command. The intelligent USIM/SIM card interface is configured for the data card to interact information with a mobile network, the SD card interface is configured for information interaction between the data card and a broadcasting & TV network, and the transmitting unit of this embodiment has an intelligent USIM/SIM card interface, or an SD card interface, or has an intelligent USIM/SIM card interface and an SD card interface simultaneously, the transmitting unit which has an intelligent USIM/SIM card interface supports to interact information with a mobile network, and the transmitting unit which has an SD card interface supports to interact information with the SD card, and the transmitting unit which has an intelligent USIM/SIM card and an SD card interface simultaneously supports to interact information with the mobile terminal or the SD card and it can select an object which will interact information with the transmitting unit according to practical application requirements, and switches between these two kinds of interfaces so as to achieve the docking with various interfaces, which enriches information interaction modes and improves the universality of CMMB playing method.

Preferably, in the above playing apparatus, the authentication branch command comprises: a first authentication branch command for indicating that the authentication mode is via the intelligent USIM/SIM card interface; and a second authentication branch command for indicating that the authentication mode is to via the SD card interface.

In this embodiment, the authentication branch command generated by the authentication adaptation layer module includes a first authentication branch command for instructing that the authentication mode is via the intelligent USIM/SIM card interface and a second authentication branch command for instructing that the authentication mode is to via the SD card interface.

When generating the first authentication branch command, the transmitting unit interacts information with the mobile network via the intelligent USIM/SIM card interface and the telecommunication basic service module, which achieves the authorization and authentication of current subscribers. Interacting with the mobile network via the intelligent USIM/SIM card is one of the main methods achieving authorization and authentication, and this embodiment completes the authentication step in the CMMB playing method by configuring the intelligent USIM/SIM card interface.

When generating the second authentication branch command, the transmitting unit interacts with an SD card which has authentication, descrambling and decryption functions via the SD card, which achieves the authorization and authentication of current subscribers. Interacting with an SD card which has the functions of authentication, descrambling and decryption via an SD card is one of the main methods achieving authorization and authentication, and this embodiment completes the authentication step in the CMMB playing method by configuring the SD card interface.

Preferably, in the above playing apparatus, the transmitting unit further comprises: an open module for opening an order relationship table; an ordering module for ordering a program; a verifying module for verifying the validity of a service key; and a descrambling and decrypting module for descrambling and decrypting a scrambled and encrypted program in the China mobile multimedia broadcasting coding streams.

The transmitting unit in this embodiment further includes: an open module, an ordering module, a verifying module and a descrambling and decrypting module. This enables the apparatus for playing the China mobile multimedia broadcasting service has the function of opening order relationship, ordering a program, verifying service key validity, and descrambling and decrypting the scrambled and encrypted CMMB programs. This embodiment not only supports the authentication of CMMB service and the updating of service guide and order relationship and also supports the decryption and descrambling of CMMB service, on the one hand, it enhances security and meets the control of subscriber authority by the providers, and on the other hand, the integration and support of multi-function also facilitates the use of subscribers.

It can be seen from the above description that the above embodiments of the present invention achieves the authority control of subscribers demanding and viewing CMMB programs by the providers.

Furthermore, the implementation of the present invention makes no modification to the system architecture and the current process procedure, which is easy to implement and promote in the technical field and has rather strong industry applicability.

Obviously, it should be understood by those skilled in the art that, the above various modules or steps of the present invention may be implemented by use of a universal computing device; they may be centralized at a single computing device or distributed at the network composed of multiple computing devices; alternatively, they may be implemented by an executable program code of computing device, therefore which may be stored in a storage device and executed by a computing device, or which may be respectively formed as various integrated circuit modules, or multiple modules or steps of which may be formed as single integrated circuit module. Therefore, the present invention is not limited to any specific combination of hardware and software.

The foregoing is only preferred embodiments of the present invention and is not for use in limiting the protection scope thereof, and for those skilled in the art, there may be various modifications and changes to the present invention. Any modification, equivalent replacement and improvement made under the spirit and principle of the present invention should be included in the protection scope thereof.

What is claimed is:

1. A method for playing mobile multimedia broadcasting services, wherein the method comprises the following steps:
    judging, by a data card, whether a current subscriber has passed authentication;
    the data card transmitting mobile multimedia broadcasting data to a terminal device according to the judgment result; and
    the terminal device playing the mobile multimedia broadcasting data;
    wherein the step of the data card transmitting the mobile multimedia broadcasting data to the terminal device comprises:
    the data card responding to a first updating request towards a program service guide initiated by the terminal device and an open request towards an order relationship table initiated by the terminal device;
    a subscriber selecting a program channel;
    the data card responding to a second updating request towards program order information initiated by the terminal device and a verification request towards the service key validity of the program channel initiated by the terminal device; and
    the data card transmitting the mobile multimedia broadcasting data to the terminal device according to the open request, the second updating request and the verification request.

2. The method according to claim 1, wherein the data card comprises an authentication adaptation layer module and a telecommunication basic service module, and the data card further comprises: an intelligent USIM/SIM card interface and/or a secure digital card interface.

3. The method according to claim 2, wherein the step of the data card transmitting the mobile multimedia broadcasting data to a terminal device according to the judgment result comprises:
    if the current subscriber has passed the authentication, then the data card transmitting the mobile multimedia broadcasting data to the terminal device.

4. The method according to claim 2, wherein the step of the data card transmitting the mobile multimedia broadcasting data to a terminal device according to the judgment result comprises:
    if the current subscriber has not passed the authentication, then the authentication adaptation layer module generating an authentication branch command;
    the data card carrying out authorization and authentication according to the authentication branch command; and
    the data card transmitting the mobile multimedia broadcasting data to the terminal device.

5. The method according to claim 4, wherein when the authentication branch command instructs that the authentication mode is via the intelligent USIM/SIM card interface, the data card carrying out authorization and authentication according to the authentication branch command comprises:
    the data card interacting with a mobile network to carry out the authorization and authentication via the intelligent user service identity module/subscriber identity module card interface, an intelligent user service identity module/subscriber identity module card, and the telecommunication basic service module.

6. The method according to claim 5, wherein when the authentication branch command instructs that the authentication mode is via the secure digital card interface, the data card completing authorization and authentication according to the authentication branch command comprises:

the data card interacting with a secure digital card via the secure digital card interface to carry out the authorization and authentication.

7. The method according to claim 1, wherein the step of the data card responding to a first updating request towards a program service guide initiated by the terminal device and an open request towards an order relationship table initiated by the terminal device comprises:

the terminal device acquiring the program service guide and the order relationship table;

the data card acquiring the program service guide and the order relationship; and the terminal device judging whether the order relationship table is opened;

if the order relationship table is not opened, then the data card opening the order relationship.

8. The method according to claim 7, wherein the step of the data card responding to a second updating request towards program order information initiated by the terminal device and a verification request towards the service key validity of the program channel initiated by the terminal device comprises:

the terminal device judging whether the program has already been ordered;

if the program has not been ordered, then the data card completing the order of the program;

the terminal device starting the verification of the service key validity of the program channel; and the data card carrying out the verification of the service key validity.

9. The method according to claim 8, wherein the step of the data card transmitting the mobile multimedia broadcasting data to the terminal device according to the open request, the second updating request and the verification request comprises:

if the order relationship has already been opened, the program has already been ordered and the service key is valid, then the data card transmitting a mobile multimedia broadcasting coding stream to the terminal device;

the terminal device reading a coding stream of an encrypted encryption key of the program stream in the mobile multimedia broadcasting coding stream transmitted by the terminal device and composing the coding stream of an encrypted encryption key of the program stream into a packet;

the data card decrypting the packet according to the service key to obtain the encryption key of the program stream; and the terminal device decrypting the coding stream of the encryption key encrypting the program stream according to the encryption key of the program stream to obtain a clear program stream; and the step of the terminal device playing the mobile multimedia broadcasting data comprises:

the terminal device playing the clear program stream.

10. The method according to claim 1, wherein the mobile multimedia broadcasting is China mobile multimedia broadcasting.

11. An apparatus for playing the mobile multimedia broadcasting services, the apparatus comprises:

an authentication judging unit, configured to judge whether a current subscriber has passed authentication;

a transmitting unit, configured to transmit mobile multimedia broadcasting data according the judgment result; and a playing unit, configured to play the mobile multimedia broadcasting data;

wherein the transmitting unit further comprises:

an open module, configured to open an order relationship table;

an order module, configured to order a program;

a verifying module, configured to verify the validity of a service key; and a descrambling and decrypting module, configured to descramble and decrypt a scrambled and encrypted program in the mobile multimedia broadcasting coding stream.

12. The apparatus according to claim 11, wherein the transmitting unit comprises:

an authentication adaptation layer module, configured to generate an authentication branch command;

a telecommunication basic service module, configured to interact with a mobile network; and an intelligent USIM/SIM card interface and/or a SD card interface.

13. The apparatus according to claim 12, wherein the authentication branch command comprises:

a first authentication branch command, configured to indicate that the authentication mode is via the intelligent user service identity module/subscriber identity module card interface; and/or a second authentication branch command, configured to indicate that the authentication mode is via the secure digital card interface.

14. The apparatus according to claim 13, wherein the transmitting unit further comprises:

an open module, configured to open an order relationship table;

an order module, configured to order a program;

a verifying module, configured to verify the validity of a service key; and a descrambling and decrypting module, configured to descramble and decrypt a scrambled and encrypted program in the mobile multimedia broadcasting coding stream.

15. The apparatus according to claim 11, wherein the mobile multimedia broadcasting is China mobile multimedia broadcasting.

* * * * *